No. 863,353.
PATENTED AUG. 13, 1907.
W. C. BROADWELL.
TIRE TOOL.
APPLICATION FILED NOV. 21, 1906.
2 SHEETS—SHEET 1.
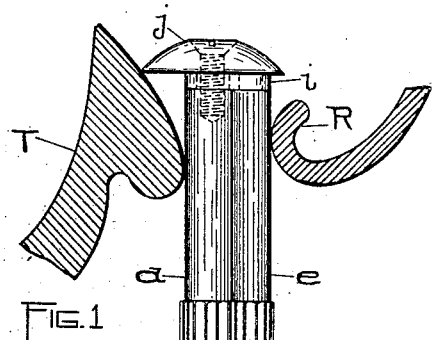
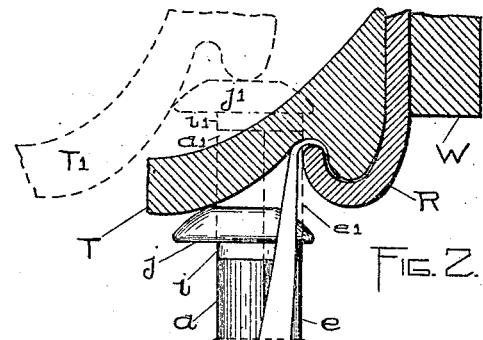
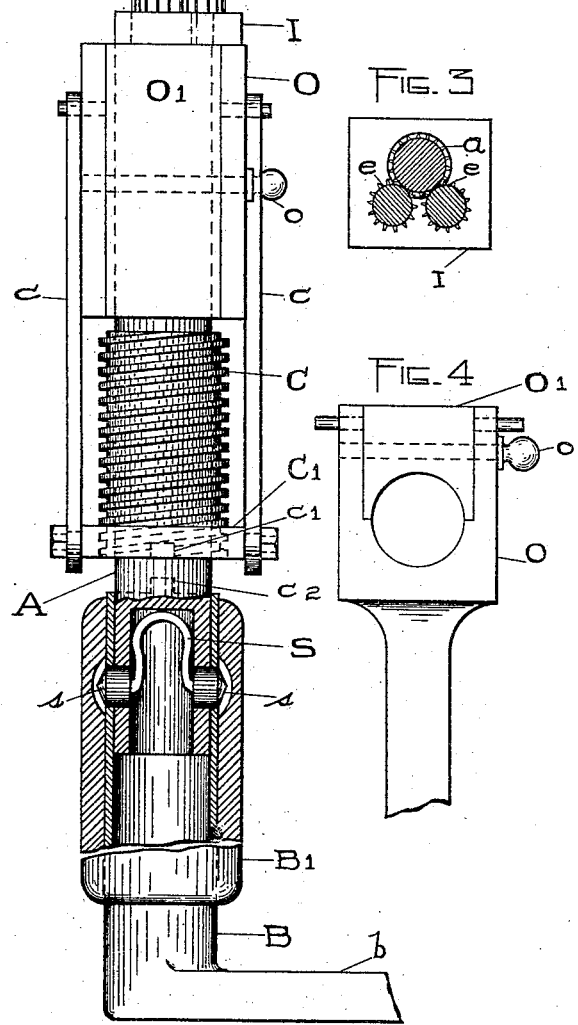
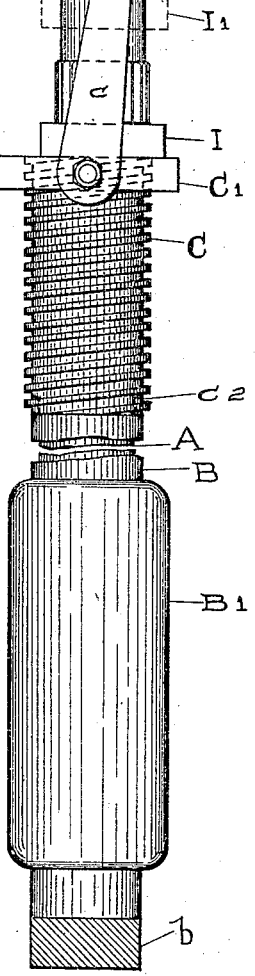
WITNESSES:
Osborne F. Gurney
Lottie Wood
INVENTOR:
William C. Broadwell
By W. H. Cooley ATTY

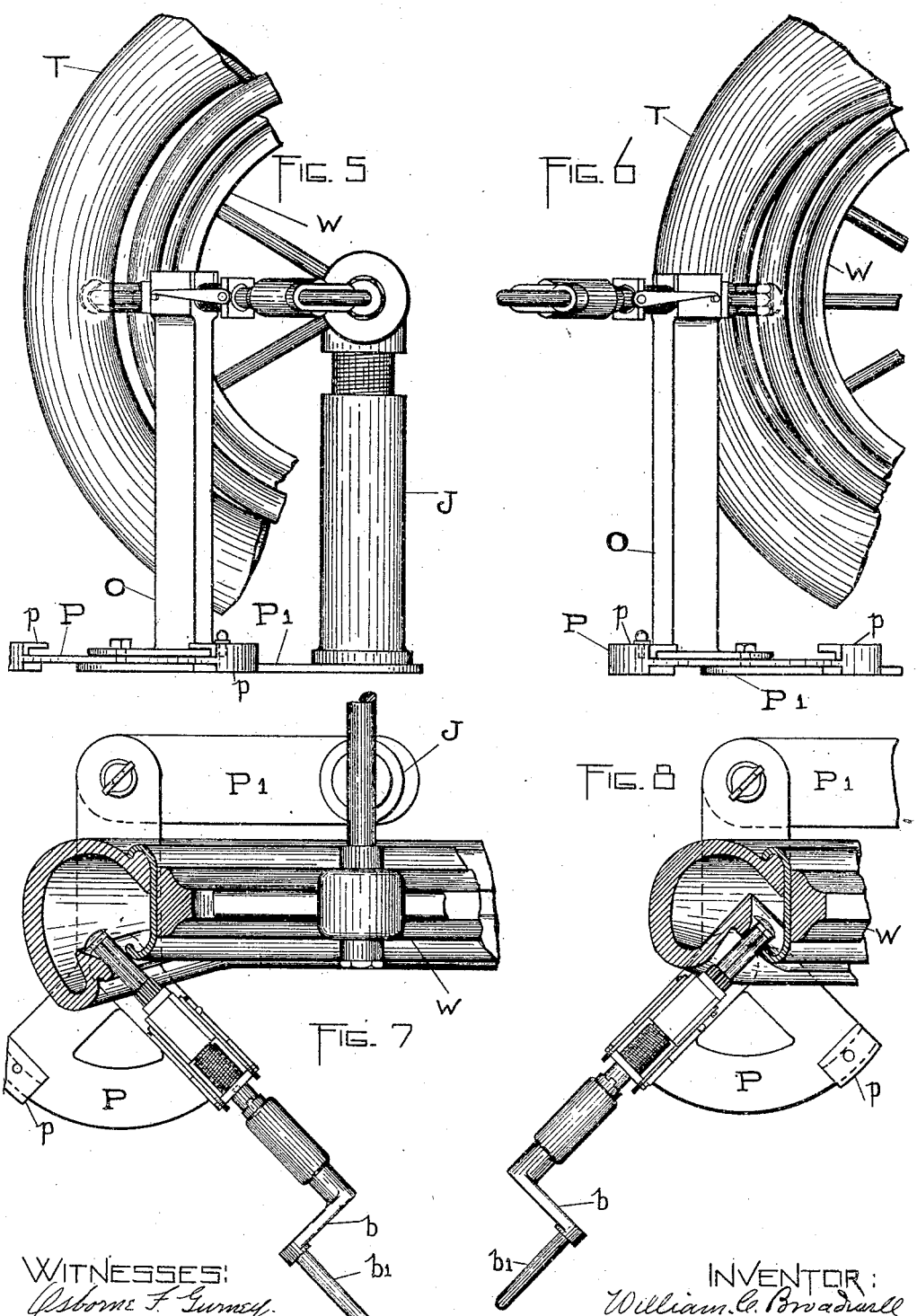

UNITED STATES PATENT OFFICE.

WILLIAM C. BROADWELL, OF ROCHESTER, NEW YORK.

TIRE-TOOL.

No. 863,353.

Specification of Letters Patent.

Patented Aug. 13, 1907.

Application filed November 21, 1906. Serial No. 344,391.

*To all whom it may concern:*

Be it known that I, WILLIAM C. BROADWELL, a citizen of the United States, and a resident of Rochester, in the county of Monroe and State of New York, have invented a new and Improved Tire-Tool, of which the following is a specification.

This invention relates to means for placing a clencher tire on the rim of an automobile wheel and also for removing the same therefrom, during each of which operations the inner tube is of course not inflated.

The object of my invention is to provide an efficient and easily operable device, for the purpose described, comprising means for forcing the tire out of engagement with the inwardly turned flange on the rim of the wheel adapted to coöperate with the device for completely removing one side of the tire from the rim. I have found it desirable to provide a construction whereby the friction between such device and the parts engaged thereby is reduced to that resulting from a rolling contact, and I have also found it desirable to provide means whereby coöperating rollers may be simultaneously rotated.

My invention comprises then a roller and a supporting element therefor by means of which the same may be held to form a rolling incline extending within and without the tire engaging edge of the flange on the rim to support and force the tire over the rim.

The accompanying drawings illustrating my invention are as follows:—

Figure 1 shows in plan view my device seated in its support and in position for removing the tire. Fig. 2 is a plan view with the parts in position for forcing the edge of the tire out of engagement with the rim of the wheel. Fig. 3 is a horizontal sectional view of the rollers $a$ and $e$ taken just above the toothed portions thereof. Fig. 4 is an edge view of the upper end of the bearing standard. Fig. 5 shows in side view an automobile wheel with my device in position for removing the tire. Fig. 6 is a similar view of the parts in position for replacing the tire. Figs. 7 and 8 are plan views of the parts as been in Figs. 5 and 6 respectively.

Similar letters refer to similar parts in all of the drawings.

Referring then to Figs. 1 and 2,—A is a rod turned down to form a shoulder to receive the bearing plate I revoluble upon such turned down portion, which extends a short distance beyond the plate I and has cut thereon teeth, as indicated, and beyond such teeth such rod is again turned down to form a plain roller $a$, shouldered into a second bearing plate $i$, outside of which is secured a washer $j$ by means of a screw threaded into the outer end of the roller $a$. This washer $j$ operates as a guard to protect the inner tire tube in the manipulation of the tool and also to retain the inner edge of the tire upon the tool and prevent it slipping off from the end of the tire engaging roller. In the bearing plates I and $i$ are bored holes to constitute bearings for the two rollers $e$ having plain portions, preferably contacting with the plain roller $a$ and also toothed portions adapted to mesh with the teeth on the roller $a$. The lower end of the rod A is tubular to receive the body of the double spring key S engaging through slots therefor in the walls of such tubular portion and also through suitably alined holes therefor in the tubular crank bar B and in the tubular portion of the rod A. The ends $s$ of the key S extend outwardly through the slots in the tube B such a distance and they are so conformed that they may be forced inwardly far enough by sliding the handle $B^1$ on the tube B to permit the tube B to then be drawn longitudinally upon the rod A, thus forcing the extreme outer ends $s$ of the key S entirely within the inner periphery of the tube B, which, when moved longitudinally on the rod A to the position indicated in Fig. 2, may be freely revolved thereon. A threaded sleeve C is seen both slidably and rotatably mounted on the rod A and threaded through the traveling nut $C^1$, upon opposite ends of which are pivoted hooks $c$, having free ends adapted to engage over the rim R and under the tire T of the wheel W, as indicated in Fig. 2. The lower end of the sleeve C has a notch $c^1$ adapted to be engaged by a corresponding projection $c^2$ on the upper end of the tube B, having the crank $b$ carrying the handle $b^1$ on its lower end.

The device may be inserted in either one of two ways, as desired, which I will now describe. The parts may be moved to the positions indicated in full lines in Fig. 2 with the hooks $c$ engaging the edge of the rim R of the wheel, then upon turning the crank $b$ by means of the handle $b^1$, the parts I, $a$, $e$, $i$ and $j$ are forced to the positions indicated in dotted lines in Fig. 2 at $I^1$, $a^1$, $e^1$, $i^1$ and $j^1$, forcing the tire T inwardly also to the position indicated in dotted line at $T^1$, immediately after which by swinging the outer or lower end of the device around, the parts may be caused to assume the positions indicated in Figs. 1, 5 and 7 with the roller $a$ engaging under the edge of the tire T and the rollers $e$ engaging the rim R, before which the hooks $c$ will of course have been disengaged from the rim R and the sleeve C moved longitudinally upon the rod A to the position indicated in Figs. 1, 5 and 7, permitting then the rod A to be seated in the bearing therefor in the upper end of the standard O with the retaining plate $o^1$ inserted and held in place by the pin $o$; or the nut $C^1$ may be adjusted on the sleeve C in the first place so as to secure the relative positions of the parts of the device indicated in dotted lines at $I^1$, $a^1$, $e^1$, $i^1$ and $j^1$ and then the device is swung around to the right upon its pivotal connection with the hooks $c$ and such hooks $c$ also swung around to the right towards the center of the wheel. Then upon drawing the device to the left to the position practically such as indicated in Fig. 2 and approximately parallel with the axis of the wheel, the parts will be caused to assume the position already just above described with reference to the first method of inserting the device but with the tire T forced to the position indicated at T¹, after which the device may be seated in its bearings in the manner already just above described. The conformation of the hooks c where they engage the rim R is such as to admit of their being swung around when in engagement with the rim R as just above described.

Figs. 1, 5 and 7 show the arrangement of the device for removing the tire T from the rim R of the wheel W, which operation may be effected by rotating the wheel while the device is firmly held in position in the standard O, or preferably, by turning the crank b by the handle b¹. The standard O is pivotally supported on a plate P in such a way that it may be swung to the position indicated in Figs. 5 and 7 for removing the tire, or to the position indicated in Figs. 6 and 8 for replacing the tire. The rear end of the foot of the standard O is pivotally connected to the plate P by means of a bolt or rivet, seen only in Figs. 5 and 6 and the front edge of the foot of such standard is arranged to swing under an inwardly extending flange p formed on or carried by the plate P and adapted to engage the foot of such standard O when the same is moved to either extreme position, in either of which positions such standard may be held by means of a suitable pin, as shown, extending through such flange p and into the foot of the standard O. The plate P is pivotally connected by means of a bolt and thumb nut as shown to the plate P¹ adapted to extend under the axle of the wheel and receive a jack J, of any preferred construction, by means of which the axle of the wheel may be raised. When it is desired to place the tire on the rim, the tire is forced over the rim part way around the wheel and the device is inserted over the rim of the wheel and under the inner edge of the tire and then swung to the position indicated in Figs. 6 and 8 and then by either rotating the wheel or turning the crank b, the tire is carried around and over the edge of the rim R, and permitted to spring into place. The usual retaining lugs may then be screwed up and the inner tire inflated.

In most cases the device may be held in proper position either for removing or replacing the tire by means of the handle B¹ on the tube B without the use of the standard O, but when the device cannot thus be held by hand the standard O and its connections is made use of.

The operation of my device is believed to be sufficiently clear from the above description to call for no further explanation.

It is of course immaterial which edge of the rim of the wheel the hooks c, carried by the nut C¹, are arranged to engage, although I prefer that such hooks be adapted to engage the side of the rim towards the operator as shown in the drawings. It will of course be understood that the rod A and the tube B with the handle B¹ thereon comprise means for supporting the rollers a and e at an operative angle with the plane of the wheel, from which the tire is to be removed, and that, as an additional aid, the standard O and its connections is sometimes necessary or desirable. By the term "operative angle" I mean such an angle as will secure the operation above mentioned, that is,—the angle must be such that the tire will slide off from the device practically within the plane of the inner edge of the flange on the rim R for placing the tire, and for removing it, such that the tire will, in sliding off from the roller a, just pass by the outer edge of the rim R, and I have found with the parts proportioned as indicated in the drawings, that, at an angle of approximately 45 degrees from the plane of the wheel, the device works very satisfactorily. The device may be used with the positions of the rollers a and e reversed, although I prefer to use them as shown in the drawings.

What I claim is:—

1. In a device of the character described; an arm adapted to be inserted between the tire and the rim of the wheel and to react on the rim and a support adapted to hold such arm at an operative angle with the plane of the wheel with one end engaging between the rim and the tire and the other end extending in a direction oblique to the axis of the wheel and effectively in a plane radial thereto.

2. In a device of the character described; a member adapted to be inserted between the tire and the rim of the wheel, and a support adapted to hold such member at an operative angle with the plane of the wheel with one end engaging between the rim and the tire, such support having an arm adapted to receive a jack for sustaining the axle of the wheel.

3. In a device of the character described; a member adapted to be inserted between the tire and the rim of the wheel and a support adapted to hold such member at an operative angle with the plane of the wheel with one end engaging between the rim and the tire, such support having pivotally connected thereto an element adapted to sustain the axle of the wheel.

4. In a device of the character described; an arm adapted to be inserted between the tire and the rim of the wheel reacting on the rim and a support adapted to hold such arm at an operative angle with the plane of the wheel with an element at one end engaging between the rim and the tire in contact with the tire and out of contact with the rim and with the other end extending in a direction oblique to the axis of the wheel and effectively in a plane radially thereto.

5. In a device of the character described; a roller and means reacting on the rim for revolubly supporting and holding the roller at an operative angle with the plane of the wheel to form a rolling incline engaging between the tire and the rim and extending within and outside of the tire-engaging edge of the flange of the rim, adapted to support and force the inner edge of the tire over the flange of the rim.

6. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim and means reacting on the rim for holding such roller out of contact with the rim.

7. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim and a second roller revolubly supported by such means adapted to engage the rim and hold such first roller out of contact therewith.

8. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim and two other rollers revolubly supported by such means, the second adapted to engage the rim and the third adapted to engage the tire of the rim to hold the first roller out of contact with the rim and the second roller out of contact with the tire.

9. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim and means for rotating such roller.

10. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim; means for holding such roller out of contact with the rim and means for rotating such roller.

11. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim; a second roller revolubly supported by such means adapted to engage the rim and hold such first roller out of contact therewith and means for rotating one of such rollers.

12. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim; a second roller revolubly supported by such means adapted to engage the rim and hold such first roller out of contact therewith, such rollers having intermeshing teeth and means for rotating one of such rollers.

13. In a device of the character described; a roller and means reacting on the rim of the wheel for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim and means for advancing such roller relatively to and around the rim of the wheel.

14. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim; means reacting on the rim for holding such roller out of contact with the rim and means for advancing such roller relatively to and around the rim of the wheel.

15. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim; a second roller revolubly supported by such means adapted to engage the rim and hold such first roller out of contact therewith and means for advancing such rollers relatively to and around the rim of the wheel.

16. In a device of the character described; a roller and means for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim; two other rollers revolubly supported by such means, the second adapted to engage the rim and the third adapted to engage the tire or the rim to hold the first roller out of contact with the rim and the second roller out of contact with the tire and means for advancing such rollers relatively to and around the rim of the wheel.

17. A tire tool comprising an arm reactively engaging the rim of the wheel and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim.

18. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim and means reacting on the rim for holding such roller out of contact with the rim.

19. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim and a second roller revolubly supported by such arm adapted to engage the rim.

20. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller revolubly supported by such arm adapted to engage the rim and means for holding such first roller out of contact with the rim.

21. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller revolubly supported by such arm adapted to engage the rim and means engaging the tire or the rim for holding such first roller out of contact with the rim.

22. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim and two other rollers revolubly supported by such arm, the second adapted to engage the rim and the third adapted to engage the tire or the rim to hold the first roller out of contact with the rim.

23. A tire tool comprising an arm reactively engaging the rim of the wheel and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim and means for rotating such roller.

24. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; means for holding such roller out of contact with the rim and means for rotating such roller.

25. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller revolubly supported by such arm adapted to engage the rim and means for rotating one of such rollers.

26. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller revolubly supported by such arm adapted to engage the rim; means for holding such first roller out of contact with the rim and means for rotating one of such rollers.

27. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller revolubly supported by such arm adapted to engage the rim, such rollers having intermeshing teeth and means for rotating one of such rollers.

28. A tire tool comprising an arm reactively engaging the rim of the wheel and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim and means for advancing such roller relatively to and around the rim of the wheel.

29. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; means reactively engaging the rim for holding such roller out of contact with the rim and means for advancing such roller relatively to and around the rim of the wheel.

30. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller revolubly supported by such arm adapted to engage the rim and means for advancing such rollers relatively to and around the rim of the wheel.

31. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller revolubly supported by such arm adapted to engage the rim; means for holding such first roller out of contact with the rim and means for advancing such rollers relatively to and around the rim of the wheel.

32. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller revolubly supported by such arm adapted to engage the rim and means for rotating one or both of such rollers to advance the tool relatively to and around the rim of the wheel.

33. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; a second roller supported by such arm adapted to engage the rim; means for holding such first roller out of contact with the rim and means for rotating one or both of such rollers to advance the tool relatively to and around the rim of the wheel.

34. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim; two other rollers revolubly supported by such arm, the second adapted to engage the rim and the third adapted to engage the tire or the rim to hold the first roller out of contact with the rim and means for rotating one or more of such rollers to advance the tool relatively to and around the rim of the wheel.

35. In a tire tool; a member adapted to be inserted between the wheel rim and the tire and means for engaging and acting on the rim for moving such member along the rim.

36. In a tire tool; a member adapted to be inserted between the wheel rim and the tire to insert or remove the tire; a roller connected with such member and adapted to engage the wheel rim and means for rotating the roller to move such member along the rim.

37. In a tire tool; a member adapted to be inserted between the wheel rim and the tire to insert or remove the tire; two rollers connected with such member adapted to engage the rim and hold such member out of contact with the rim and means for rotating one or both of such rollers to move the tool along the rim.

38. In a tire tool; a roller adapted to be inserted between the wheel rim and the tire; a support for such roller and means connected with such support engaging the rim for moving the roller along the rim.

39. In a tire tool; a roller revolubly supported upon a member and adapted to be inserted between the wheel rim and the tire; a second roller revolubly mounted on said member and adapted to engage the rim and means for rotating one of such rollers to advance the tool along the rim.

40. In a tire tool; a tire-engaging roller adapted to be inserted between the wheel rim and the tire; means for revolubly supporting such roller out of contact with the rim and means for rotating such roller to cause the tool to move along the rim.

41. In a tire tool; a roller adapted to be inserted between the wheel rim and the tire and to engage the tire; means for revolubly supporting such roller out of contact with the rim; a second roller mounted on such means for engaging the rim and means for rotating the tire-engaging roller to cause the tool to move along the rim.

42. In a tire tool; a roller adapted to be inserted between the wheel rim and the tire and to engage the tire; means for revolubly supporting such roller out of contact with the rim; a second roller mounted on such means for engaging the rim and means for rotating the rollers to cause the tool to move along the rim.

43. In a tire tool; a roller to be inserted between the wheel and the tire; means for revolubly supporting such roller out of contact with the rim; two rollers rotatably mounted on such means adapted to engage the rim and means for rotating the rollers in unison to cause the tool to move along the rim.

44. In a tire tool; a roller-supporting member and two rollers rotatably mounted on said member in overlapping and substantially parallel positions, one of such rollers adapted to engage the tire and the other roller adapted to engage the rim.

45. In a tire tool; a roller-supporting member and three rollers rotatably mounted on said member in overlapping and substantially parallel positions, a first one of such rollers adapted to engage the tire the second roller adapted to engage the rim and the third roller adapted to engage with the rim or the tire.

46. A tire applying or removing tool comprising a roller supporting member and two rollers rotatably mounted on said member in overlapping and substantially parallel positions.

47. A tire applying or removing tool comprising a roller-supporting member and three rollers rotatably mounted on said member in overlapping and substantially parallel positions.

48. A tire applying or removing tool comprising a roller supporting member; two rollers rotatably mounted on said member in overlapping and substantially parallel positions and means for rotating one of the rollers to cause the tool to move along the rim.

49. A tire applying or removing tool comprising a roller-supporting member; three rollers rotatably mounted on said member in overlapping and substantially parallel positions and means for rotating one of the rollers to cause the tool to move along the rim of the wheel.

50. In a tire tool; a roller-supporting member; three rollers rotatably mounted on said member and adapted to be inserted between the wheel rim and the tire; gearing connecting the rollers and means for rotating the rollers to cause the tool to move along the rim.

51. A tire tool comprising an arm reactively engaging the rim of the wheel and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim, and a guard at the inner end of the roller and projecting above the roller to retain the tire upon the roller.

52. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim, and a guard distinct from the roller at the inner end of the roller formed to present a smooth and rounded surface to the inner tube and projecting above the roller.

53. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim, and a guard rotatable independently of the roller at the inner end of the roller and projecting above the roller to engage the tire to retain the tire upon the roller.

54. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim, and a guard rotatable independently of the roller at the inner end of the roller formed to present a smooth and rounded surface to the inner tube and projecting above the roller.

55. In a tire tool; a roller supporting member and two rollers for engaging the wheel rim and the tire, respectively, said rollers being rotatably mounted on said member in overlapping and substantially parallel positions, and a guard at the inner end of the tire engaging roller and projecting above such roller to engage the tire and retain the tire thereupon.

56. In a tire tool; a roller supporting member and two rollers for engaging the wheel rim and the tire, respectively, said rollers being rotatably mounted on said member in overlapping and substantially parallel positions, and a freely rotatable guard at the inner end of the tire engaging roller and projecting above such roller to engage the tire and retain the tire thereupon.

57. In a tire tool; a roller supporting member and two rollers for engaging the wheel rim and the tire, respectively, said rollers being rotatably mounted on said member in overlapping and substantially parallel positions, and a guard at the inner end of the roller formed to present a smooth and rounded surface to the inner tube and projecting above the roller.

58. In a tire tool; a roller supporting member and two rollers for engaging the wheel rim and the tire, respectively, said rollers being rotatably mounted on said member in overlapping and substantially parallel positions, and a freely rotatable guard at the inner end of the roller formed to present a smooth and rounded surface to the inner tube and projecting above the roller.

59. In a tire tool; a roller adapted to be inserted between the wheel rim and the tire; a freely rotatable guard at the inner end of the roller and projecting above the roller; a support for the roller, and means connected with the support for engaging and acting upon the rim to move the member along the rim.

60. In a tire tool; an element adapted to engage between the tire and the rim of the wheel; a hook or hooks adapted to engage the rim of the wheel; two coöperating threaded members one connected to such hook or hooks and the other to such element and means for rotating one of such threaded members relatively to the other to force such element into engagement between the tire and the rim.

61. In a tire tool; an element adapted to engage between the tire and the rim of the wheel and extend transversely of the plane of the wheel; a member longitudinally adjustable on such element and a hook or hooks adapted to engage with the rim of the wheel and pivotally connected to such member, whereby said element may be actuated transversely of the plane of the wheel.

WILLIAM C. BROADWELL.

Witnesses:
LOTTIE WOOD,
OSBORNE F. GURNEY.